United States Patent
Dugan et al.

(10) Patent No.: US 10,528,221 B2
(45) Date of Patent: Jan. 7, 2020

(54) GRAVITY MENUS FOR HAND-HELD DEVICES

(75) Inventors: Casey Dugan, Cambridge, MA (US); Michael Muller, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 1351 days.

(21) Appl. No.: 12/651,204

(22) Filed: Dec. 31, 2009

(65) Prior Publication Data

US 2011/0161884 A1  Jun. 30, 2011

(51) Int. Cl.
*G06F 3/0482*  (2013.01)
*G06F 1/16*  (2006.01)

(52) U.S. Cl.
CPC .......... *G06F 3/0482* (2013.01); *G06F 1/1626* (2013.01); *G06F 2200/1637* (2013.01)

(58) Field of Classification Search
USPC ....... 715/700, 701, 764, 766, 781, 810, 825, 715/830, 843, 863, 864
See application file for complete search history.

(56) References Cited

U.S. PATENT DOCUMENTS

| | | | | |
|---|---|---|---|---|
| 6,369,794 B1 * | 4/2002 | Sakurai | .................. | G06F 3/017 345/156 |
| 7,162,268 B2 * | 1/2007 | Koyama | ............... | G06F 1/1613 455/344 |
| 7,289,102 B2 * | 10/2007 | Hinckley et al. | ............. | 345/156 |
| 8,044,933 B2 * | 10/2011 | Hong et al. | .................... | 345/158 |
| 8,140,126 B2 * | 3/2012 | Choi | ....................... | G06F 3/017 345/156 |
| 2003/0087669 A1 * | 5/2003 | Koyama | ............... | G06F 1/1613 455/556.1 |
| 2007/0004451 A1 * | 1/2007 | C. Anderson | ......... | G06F 1/1626 455/556.1 |
| 2007/0146321 A1 * | 6/2007 | Sohn | ..................... | G06F 1/1616 345/158 |
| 2007/0174416 A1 * | 7/2007 | Waters | .................. | G06F 1/1626 709/217 |
| 2007/0180409 A1 * | 8/2007 | Sohn et al. | ................... | 715/863 |
| 2009/0179857 A1 * | 7/2009 | Hsu et al. | ...................... | 345/157 |
| 2010/0030469 A1 * | 2/2010 | Hwang et al. | ............... | 701/209 |
| 2010/0138766 A1 * | 6/2010 | Nakajima | ..................... | 715/767 |

(Continued)

*Primary Examiner* — Yongjia Pan
(74) *Attorney, Agent, or Firm* — Steven M. Greenberg, Esq.; Shutts & Bowen LLP

(57) ABSTRACT

A gravity menu management method can be provided. The method can include determining a tilt edge of a pervasive device by a tilt sensor disposed in the pervasive device. The method also can include rendering a menu bar with different drop down menus in a GUI of the pervasive device at a portion of the GUI adjacent to the determined tilt edge. In an aspect of the embodiment, the method additionally can include determining an angle of inclination of the pervasive device by the tilt sensor and managing a number of menu items in the drop down menus of the menu according to the determined angle of inclination. For instance, managing a number of menu items in the drop down menus of the menu according to the determined angle of inclination, can include including a terse set of menu items in the drop down menus responsive to a shallow angle of inclination, and including a verbose set of menu items in the drop down menus responsive to a steep angle of inclination.

12 Claims, 2 Drawing Sheets

(56) References Cited

U.S. PATENT DOCUMENTS

2010/0161084 A1* 6/2010 Zhao .................. G01C 17/02
                                                        700/85
2011/0053641 A1* 3/2011 Lee et al. ................. 455/556.1
2011/0074671 A1* 3/2011 Shimosato ......... H04N 5/23293
                                                        345/156

* cited by examiner

GRAVITY MENUS FOR HAND-HELD DEVICES

BACKGROUND OF THE INVENTION

Field of the Invention

The present invention relates to the field of user interface management in a hand-held device and more particularly to menu configuration for a user interface of a hand-held device.

Description of the Related Art

The conventional graphical user interface (GUI) has been widely used for many years. The primary function of the GUI includes providing user interface controls with which the end user can interact with an underlying application. The common GUI includes many stock user interface controls, most of which, when combined, can accommodate most computer human interactions required by an application. For example, the static text box control can be used to present text to the end user while an edit box can permit the user to provide textual input to the application. A radio button control can provide for the exclusive selection of an element from among a field of elements, and, of course, a menu bar can provide a selection of drop down menus with menu entries logically linked to programmatic functions of an underlying application.

When user interface controls are displayed in a GUI, often one must compromise between the amount of information that can be displayed within the GUI display, and the amount of displayable space within the GUI display in which a preferred amount of information can be presented. Where the display area must be reduced due to height and width constraints, information that otherwise might be easily grouped and viewed in within a larger display space often cannot be presented as a single, cohesive set of interrelated interface controls. This circumstance has been known to arise in the use of pervasive devices, including handheld computers and portable cellular telephones. In the case of pervasive devices, the display area sometimes can be limited to as little as a one-hundred sixty (160) pixel by 160 pixel region or less.

The use of the menu bar in a constrained display area prevalent in pervasive computing devices such as personal digital assistants, cellular telephones and smart phones can be problematic where the number of menu items in a drop down menu can be greater than able to be accommodated by the constrained display. In the worst case scenario, the length of the drop down menu will exceed the constrained display thus obscuring those menu items at the bottom portion of the drop down menu and requiring manual scrolling to reach the obscured menu items. Further, the width of a constrained display can limit the number of drop down menus in a menu bar. To accommodate all possible constrained displays, the application developer then must limit the number of menu items in a drop down menu and the number of drop down menus in a menu bar to a number able to be accommodated by the most constrained display known at the expense of those devices with less constrained displays.

BRIEF SUMMARY OF THE INVENTION

Embodiments of the present invention address deficiencies of the art in respect to menu bar management in a constrained display and provide a novel and non-obvious method, system and computer program product for gravity menus. In an embodiment of the invention, a pervasive device can be provided to include a power source, a processor and memory powered by the power source and a display powered by the power source. The device also can include an operating system executing in the memory by the processor and providing a graphical user interface (GUI) in the display. Of note, the device can include a tilt sensor coupled to the processor and configured to detect a tilt edge of the device above a default position of the device, for example at one-hundred eighty (180) degrees when the device is held flat—a surface normal of the device—or at an acute angle such as ten or fifteen degrees from surface normal when the device is held slightly tilted upwards. Finally, the device can include a gravity menu module.

The module can include program code executing in the memory by the processor, and displaying a menu bar of drop down menus, each with a set of menu items, at a position in the GUI nearest to an edge of the device tilted upwards. In an aspect of the embodiment, the tilt sensor is further configured to compute an angle of inclination of the device measured between the device and an angle of a default position of the device. As such, the program code further can be enabled to increase a number of menu items in the drop down menus responsive to different angles of inclination computed by the tilt sensor. For instance, the program code can be further enabled to set a full set of menu items in the drop down menus responsive to a steep angle of inclination computed by the tilt sensor, and to set a reduced set of menu items in the drop down menus responsive to a shallow angle of inclination computed by the tilt sensor.

In another embodiment of the invention, a gravity menu management method can be provided. The method can include determining a tilt edge of a pervasive device by a tilt sensor disposed in the pervasive device. The method also can include rendering a menu bar with different drop down menus in a GUI of the pervasive device at a portion of the GUI adjacent to the determined tilt edge. In an aspect of the embodiment, the method additionally can include determining an angle of inclination of the pervasive device by the tilt sensor and managing a number of menu items in the drop down menus of the menu according to the determined angle of inclination. For instance, managing a number of menu items in the drop down menus of the menu according to the determined angle of inclination, can include including a terse set of menu items in the drop down menus responsive to a shallow angle of inclination, and including a verbose set of menu items in the drop down menus responsive to a steep angle of inclination.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for gravity menus in a GUI of a pervasive device. In accordance with an embodiment of the invention, a pervasive device can be configured to detect an angle of inclination of the device, for instance through the use of an accelerometer or gyroscope. Thereafter, as the pervasive device is tilted upwards at an angle from any edge of the device, if not already displayed, the menu bar of the device can be displayed in a portion of the GUI nearest to the edge of the device tilted upwards (the "tilt edge") and the dropdown menus of a menu bar in a GUI for the device can be configured to expand therefrom. For a conventional device design with four edges, four distinct sets of dropdown menus may be displayed, with each set of dropdown menus corresponding to a unique uppermost tilted edge of the display. Further, the dropdown menus can be configured to include more menu items in response to detecting an angle of inclination of the device that is greater than a threshold value, and less menu items in response to detecting an angle of inclination that is less than a threshold value.

Figure 1A:
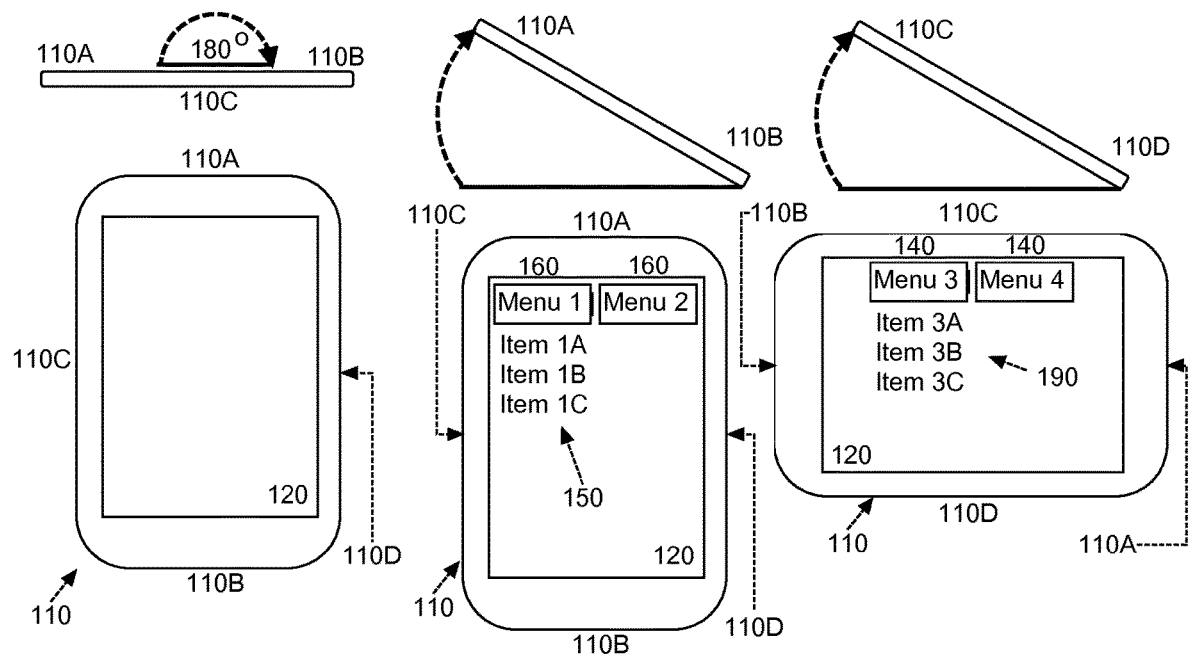
FIG. 1A is a pictorial illustration of a first pervasive device configured for gravity menus.

In further illustration, FIG. 1A pictorially depicts a first pervasive device configured for gravity menus. As shown in FIG. 1A, a pervasive device 110 defined by different edges 110A, 110B, 110C, 110D with display 120 can be configured to display dropdown menus 140 nearest to the uppermost tilted edge 110A. If the device is tilted with a different edge 110C uppermost, then a different set of dropdown menus 160 will be displayed nearest to the uppermost tilted edge 110C.

One of these dropdown menus may be selected by the user, exposing a respective submenu of menu items 150, 190. Selection may be accomplished by conventional selection operations, such as a tap with a finger or a stylus, or (for devices that include a keyboard) the use of hotkeys. Cancellation of the menu may be accomplished by tilting the device back to its original reference orientation, for example 180°.

Figure 1B:
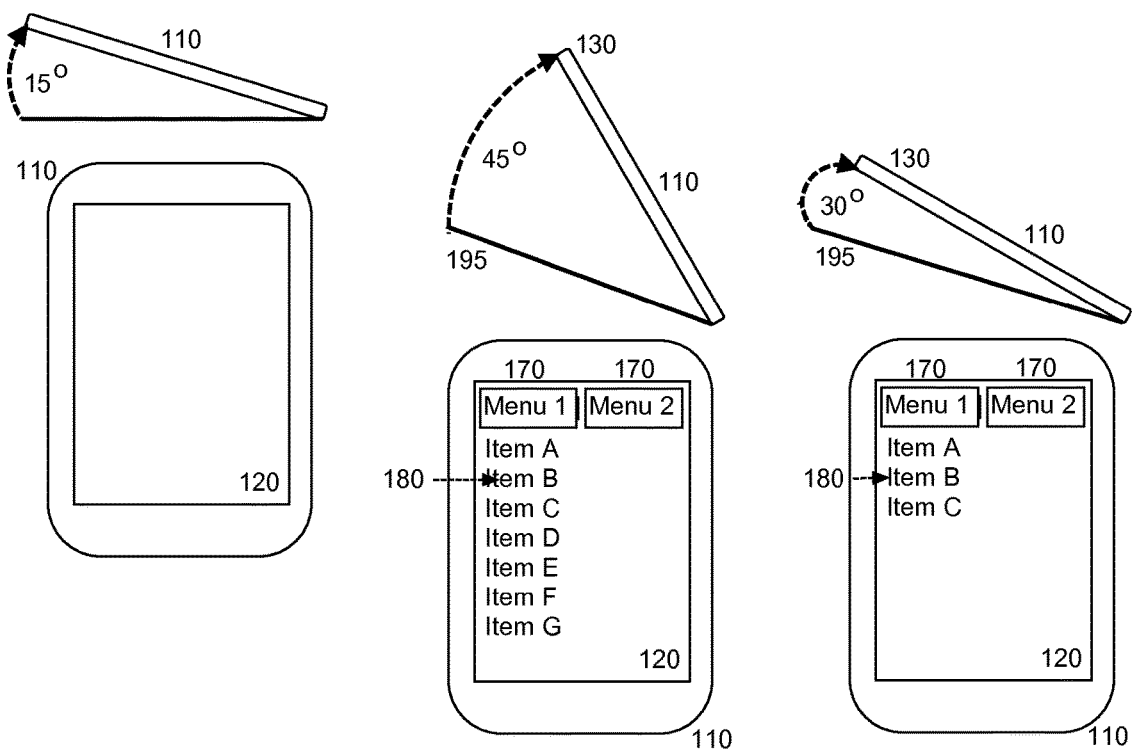
FIG. 1B is a pictorial illustration of a second pervasive device configured for gravity menus.
Figure 1C:
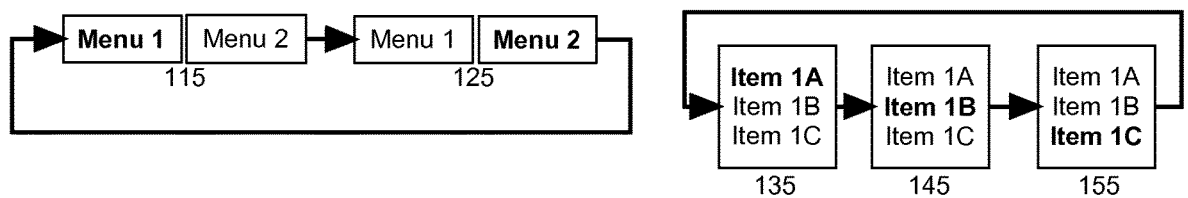
FIG. 1C is a pictorial illustration of a menu progression of menus navigated according to gravity menus.

An alternative select-operation may be achieved through a time-delay mechanism shown in FIG. 1C. Initially, the display appears with a first dropdown menu highlighted 115 as the current selection. After a time-delay, the display appears with a second dropdown menu highlighted 125. This process may be extended for a multiple different dropdown menus. Selection may be accomplished through shaking the device, or through further tilting the device to a more extreme angle. Cancellation of the menu may be accomplished, as above, by tilting the device back to its original reference orientation, for example surface normal of 180°.

Continuing with the time-delay method, once a dropdown menu has been selected, then the submenu of menu items of that dropdown menu is displayed with a first menu item highlighted 135 as the current selection. After a time-delay, the display appears with a second menu item highlighted 145 as the current selection. After a further time-delay, the display appears with a third menu item highlighted 155 as the current selection. Selection and cancellation may be accomplished as in the previous paragraph.

Referring now to FIG. 1B, in an aspect of the embodiment of the invention, a number of submenu menu items 180 included in a dropdown menu 170 can vary according to an angle of inclination of the pervasive device 110 measured from a tilted edge 130 from a reference position 195 such as 15° from surface normal. In this regard, a steeper angle of inclination can result in a verbose form of the dropdown menu 180, while a shallower angle of inclination can result in a terse form of the dropdown menu 180.

Figure 2:
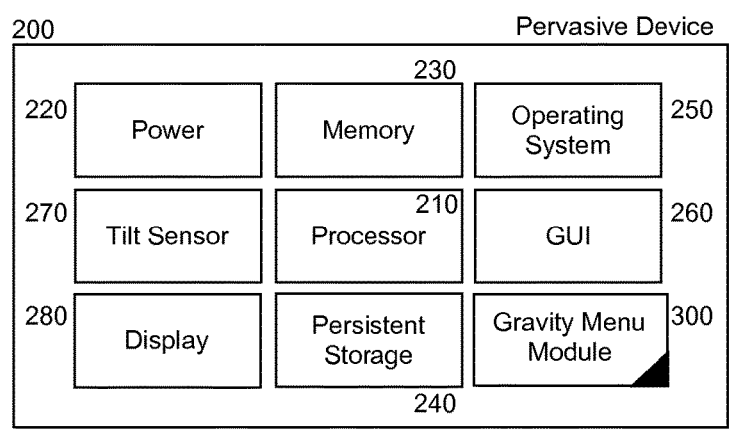
FIG. 2 is a schematic illustration of a pervasive device configured for gravity menu management of a menu in a GUI for the pervasive device.

In yet further illustration, FIG. 2 is a schematic illustration of a pervasive device configured for gravity menu management of a menu in a GUI for the pervasive device. A pervasive device 200 configured according aspects of the present invention can include a power source 220, a processor 210 powered by the power source 220, volatile memory 230 and non-volatile persistent storage 240. An operating system 250 can execute in the memory 230 and can render a GUI 260 in the display 280 through which the functionality of the operating system 250 can be accessed.

Of note, a tilt sensor 270 can be coupled to the processor 210. The tilt sensor 270 can be structurally configured to detect an orientation and angle of inclination of the device 200. For example, the tilt sensor 270 can be a gyroscope or micro-electromechanical systems (MEMS) accelerometer. A gravity menu module 300 can be coupled to the operating system 250 and the tilt sensor 270. The gravity menu module 300 can include program code loadable into the memory 230 and executable by the processor 210, can process an orientation and angle of inclination of the device 200 in order to determine where to direct a rendering of a menu bar in the GUI 260. Further, the program code of the gravity menu module 300 can be enabled to direct a density of menu items in a dropdown menu of a menu bar in the GUI 260 depending upon an angle of inclination of the device 200 detected by the tilt sensor 270.

Figure 3:
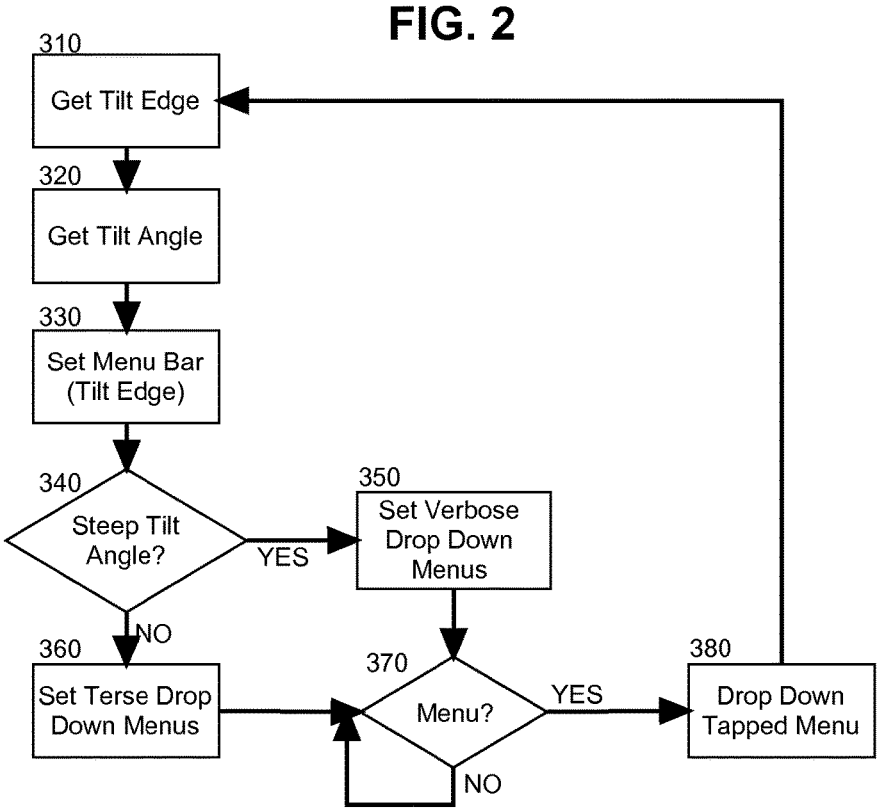
FIG. 3 is a flow chart illustrating a process for gravity menu management of a menu in a GUI for a pervasive device.

In even yet further illustration of the operation of the gravity menu module 300, FIG. 3 is a flow chart illustrating a process for gravity menu management of a menu in a GUI for a pervasive device. Beginning in block 310, a tilt edge can be detected for the pervasive device and in block 320, a tilt angle can be determined for the pervasive device. The tilt edge can be defined as an edge of the pervasive device tilted away from a default reference position defined by an opposite end of the pervasive device. In this regard, the default reference position can be pre-established as the position in which the device normally is held for nominal use, for example when the device is held flat to the surface normal plane or at a slight angle from surface normal, The angle formed between the tilt edge and the default reference position can be referred to as the angle of inclination. The default reference position either can be set manually by the end user, or the reference position can be computed by the handheld device as a position of the handheld device held relatively stable and not deviating significantly for a threshold period of time.

In block 330, a configuration of the menu bar to be displayed in a display of the pervasive device can be established at an edge of the display nearest to the tilt edge. Further, in decision block 340, it can be determined whether or not the angle of inclination of the pervasive device is steep or shallow. To the extent the angle of inclination is determined to be steep, in block 350 the number of menu items in the drop down menus of the menu bar can be set to verbose or full. Otherwise, in block 360 the number of menu items in the drop down menus of the menu bar can be set to terse or brief. Thereafter, in decision block 370 if a menu is to be invoked in the pervasive device, in block 380 the menu bar can be displayed at the configured portion of the display and a selected drop down menu can be displayed as either verbose or terse as the case may be.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A pervasive device comprising:
    a power source;
    a processor and memory powered by the power source;
    a display powered by the power source;
    an operating system executing in the memory by the processor and providing a graphical user interface (GUI) in the display;
    a tilt sensor coupled to the processor and configured to detect a tilt edge of the device above a reference position of the device and to compute an angle of inclination of the device between the tilt edge and the reference position; and,
    a gravity menu module comprising program code executing in the memory by the processor, the program code setting a number of menu items in each drop down menu of a menu bar of drop down menus to a verbose setting responsive to the tilt sensor computing a steep angle of inclination, but setting the number of menu items to a terse setting responsive to the tilt sensor computing a shallow angle of inclination, the program code additionally displaying the menu bar of the drop down menus in accordance with a corresponding setting of verbose or terse at a position in the GUI closest to the tilt edge.

2. The device of claim 1, wherein the reference position is pre-established as a position recognized in which the device is normal held during nominal use.

3. The device of claim 1, wherein the reference position is computationally determined as a position of the device when the device is held relatively stable and not deviating significantly for a threshold period of time.

4. The device of claim 1, wherein the verbose setting is a full set of menu items in each of the drop down menus and the terse setting is a limited set of one or more items in each of the drop down menus but not all menu items of the full set.

5. A gravity menu management method comprising:
    determining a tilt edge of a pervasive device by a tilt sensor disposed in the pervasive device;
    additionally determining an angle of inclination of the pervasive device by the tilt sensor;
    setting a number of menu items in each drop down menu of a menu bar of drop down menus to a verbose setting responsive to the tilt sensor computing a steep angle of inclination, but setting the number of menu items to a terse setting responsive to the tilt sensor computing a shallow angle of inclination; and,
    rendering the menu bar with different drop down menus in a graphical user interface (GUI) of the pervasive device in accordance with a corresponding setting of verbose or terse at a portion of the GUI adjacent to the determined tilt edge.

6. The method of claim 5 wherein the reference position is pre-established as a position recognized in which the device is normal held during nominal use.

7. The method of claim 5, wherein the reference position is computationally determined as a position of the device when the device is held relatively stable and not deviating significantly for a threshold period of time.

8. The method of claim 5, wherein the verbose setting is a full set of menu items in each of the drop down menus and the terse setting is a limited set of one or more items in each of the drop down menus but not all menu items of the full set.

9. A computer program product comprising a non-transitory computer usable storage medium storing computer usable program code for gravity menu management, the computer program product comprising:
    computer usable program code for determining a tilt edge of a pervasive device by a tilt sensor disposed in the pervasive device;
    computer usable program code for additionally determining an angle of inclination of the pervasive device by the tilt sensor;
    computer usable program code for setting a number of menu items in each drop down menu of a menu bar of drop down menus to a verbose setting responsive to the tilt sensor computing a steep angle of inclination, but setting the number of menu items to a terse setting responsive to the tilt sensor computing a shallow angle of inclination; and,
    computer usable program code for rendering the menu bar with different drop down menus in a graphical user interface (GUI) of the pervasive device in accordance with a corresponding setting of verbose or terse at a portion of the GUI adjacent to the determined tilt edge.

10. The computer program product of claim 9 wherein the reference position is pre-established as a position recognized in which the device is normal held during nominal use.

11. The computer program product of claim 9, wherein the reference position is computationally determined as a position of the device when the device is held relatively stable and not deviating significantly for a threshold period of time.

12. The computer program product of claim 9, wherein the verbose setting is a full set of menu items in each of the drop down menus and the terse setting is a limited set of one or more items in each of the drop down menus but not all menu items of the full set.

* * * * *